(12) United States Patent
Yamaguchi

(10) Patent No.: US 11,740,318 B2
(45) Date of Patent: Aug. 29, 2023

(54) TIRE PRESSURE MONITORING SYSTEM AND TIRE PRESSURE MONITORING METHOD

(71) Applicant: DENSO CORPORATION, Kariya (JP)

(72) Inventor: Taichi Yamaguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 318 days.

(21) Appl. No.: 17/129,363

(22) Filed: Dec. 21, 2020

(65) Prior Publication Data

US 2021/0109189 A1  Apr. 15, 2021

Related U.S. Application Data

(63) Continuation of application No. PCT/JP2019/020815, filed on May 27, 2019.

(30) Foreign Application Priority Data

Jun. 28, 2018  (JP) .................. 2018-123439

(51) Int. Cl.
| | |
|---|---|
| G01S 5/02 | (2010.01) |
| H04B 17/318 | (2015.01) |
| B60C 23/04 | (2006.01) |
| B60R 25/24 | (2013.01) |
| G01L 17/00 | (2006.01) |
| H01Q 1/32 | (2006.01) |

(52) U.S. Cl.
CPC ........ *G01S 5/0221* (2013.01); *B60C 23/0452* (2013.01); *B60C 23/0479* (2013.01); *B60R 25/245* (2013.01); *G01L 17/00* (2013.01); *G01S 5/0226* (2013.01); *G01S 5/0269* (2020.05); *H01Q 1/3208* (2013.01); *H04B 17/318* (2015.01); *B60R 2325/205* (2013.01)

(58) Field of Classification Search
CPC .... G01S 5/0221; G01S 5/0226; G01S 5/0269; G01L 17/00; H04B 17/318; H01Q 1/3208; B60C 23/0452; B60C 23/0479; B60R 25/245
USPC ........................................ 342/465
See application file for complete search history.

(56) References Cited

U.S. PATENT DOCUMENTS

| | | | |
|---|---|---|---|
| 9,844,984 B2 * | 12/2017 | Elnajjar | ............. B60C 23/0406 |
| 2008/0150712 A1 | 6/2008 | Cooprider et al. | |

(Continued)

FOREIGN PATENT DOCUMENTS

| | | | |
|---|---|---|---|
| CN | 103207089 B | * | 6/2016 |
| CN | 107933214 A | * | 4/2018 |
| JP | 2006-148321 A | | 6/2006 |

(Continued)

*Primary Examiner* — Harry K Liu
(74) *Attorney, Agent, or Firm* — Harness, Dickey & Pierce, P.L.C.

(57) ABSTRACT

A tire pressure monitoring system used for a vehicle includes a sensor unit, a receiving device, and a control device. The sensor unit is provided at each wheel of the vehicle, detects tire pressure of the each wheel with a tire pressure sensor and transmits data of the detected tire pressure by radio waves. The receiving device includes a receiving antenna that is provided at an outside of the vehicle to receive the data of the tire pressure transmitted from the sensor unit. The control device includes a data acquisition unit that acquires the data of the tire pressure received by the receiving device.

13 Claims, 5 Drawing Sheets

(56) References Cited

U.S. PATENT DOCUMENTS

2009/0102634 A1  4/2009  Okada et al.
2017/0234962 A1  8/2017  Yang et al.

FOREIGN PATENT DOCUMENTS

| JP | 4552995 B2 | 9/2010 | |
| JP | 2014019361 A | 2/2014 | |
| JP | 2015214192 A | 12/2015 | |
| JP | 2017531169 A | 10/2017 | |
| WO | WO-2019087822 A1 * | 5/2019 | ............. E05B 49/00 |

* cited by examiner

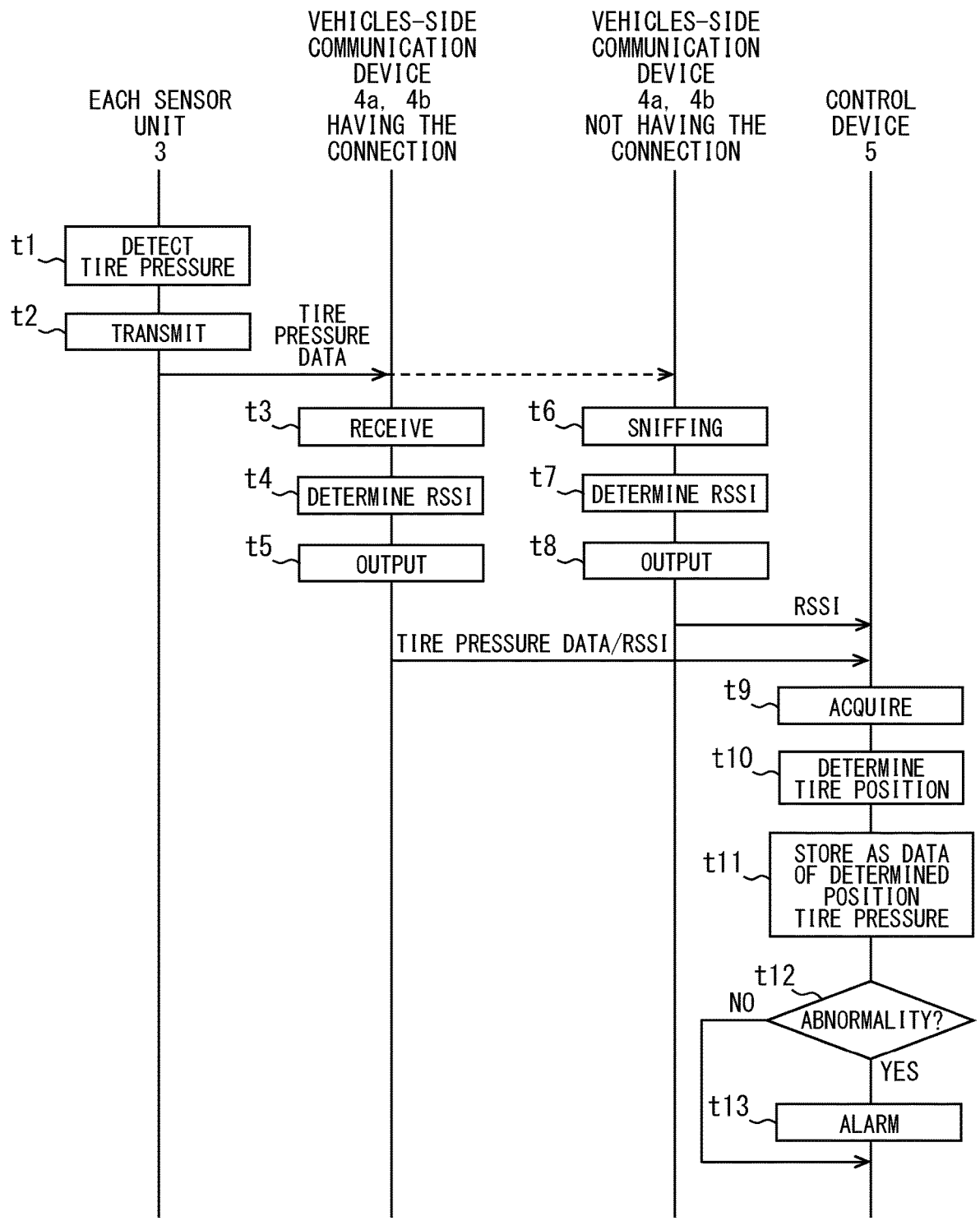

TIRE PRESSURE MONITORING SYSTEM AND TIRE PRESSURE MONITORING METHOD

CROSS-REFERENCE TO RELATED APPLICATIONS

This application is a continuation application of PCT/JP2019/020815 filed on May 27, 2019, which designated the U.S. and claims the benefit of priority from Japanese Patent Application No. 2018-123439 filed on Jun. 28, 2018. The entire disclosures all of the above applications are incorporated herein by reference.

TECHNICAL FIELD

The present disclosure relates to a tire pressure monitoring system and a tire pressure monitoring method.

BACKGROUND

A tire pressure monitoring system (TPMS) is known in which a tire pressure sensor provided at each wheel of a vehicle detects tire pressures, transmits the detected tire pressure data by radio waves, which is received by an in-vehicle device to monitor the tire pressures.

SUMMARY

The present disclosure provides a tire pressure monitoring system and a tire pressure monitoring method.

An example of a tire pressure monitoring system used for a vehicle comprises: a sensor unit that is provided at each wheel of the vehicle, detects tire pressure of the each wheel and transmits data of the detected tire pressure by radio waves; an antenna that is provided at an outside of the vehicle to receive the data of the tire pressure data transmitted from the sensor unit; and a control device that acquires the data of the tire pressure received via the antenna.

An example of a tire pressure monitoring method comprises: detecting, by a sensor unit provided at each wheel of a vehicle, tire pressure of each wheel; transmitting data of the detected tire pressure by radio wave from the sensor unit; receiving, via an antenna provided at an outside of the vehicle, the data of the tire pressure transmitted from the sensor unit; and acquiring the data of the tire pressure received via the antenna.

BRIEF DESCRIPTION OF DRAWINGS

Objects, features and advantages of the present disclosure will become more apparent from the following detailed description with reference to the accompanying drawings. In the drawings:

FIG. 7 is a sequence diagram showing an example of a flow of TPM-related processing in a vehicle system.

DETAILED DESCRIPTION

Figure 1:
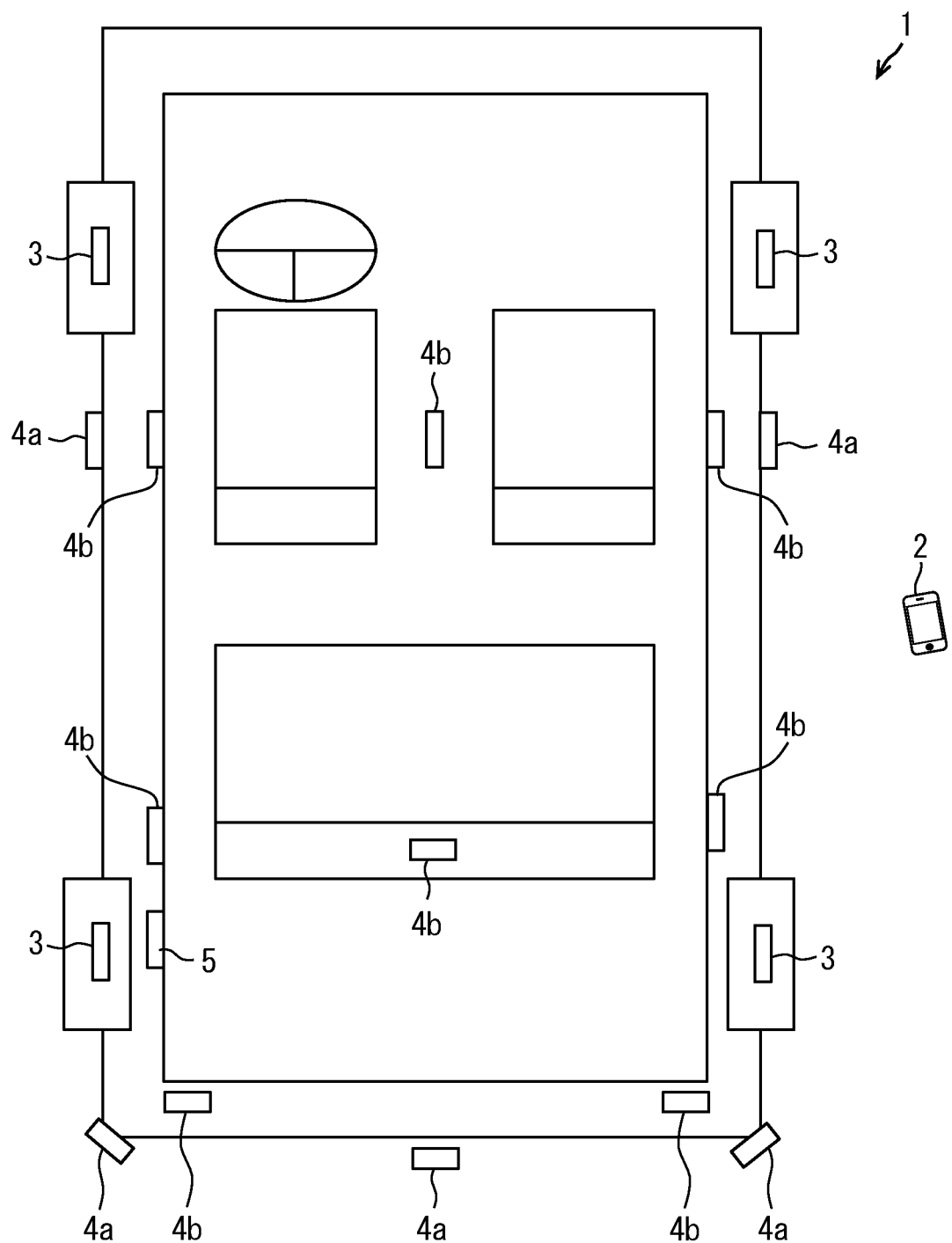
FIG. 1 is a diagram showing an example of a schematic configuration of a vehicle system.

There is a TPMS system-related technology in which an in-vehicle device controls both functions of a smart entry system and a TPMS, and in which a tire sensor transmits information to the in-vehicle device in the TPMS by using radio waves in an RF band that is used to transmit information from a mobile device to the in-vehicle device in the smart entry system. The RF band radio waves are received with a tuner of the in-vehicle device mounted to the vehicle, that is, a tuner in the vehicle.

In this technology, the information from the tire sensor is transmitted to the tuner in the vehicle by using the radio waves in the RF band, but if the frequency band of the radio waves used is high, such as the GHz band, the radio waves are easily reflected, and therefore, it becomes difficult for the tuner in the vehicle to receive the information from the tire sensors of all of the wheels, and it becomes difficult for the in-vehicle device to monitor the tire pressures.

One object of this disclosure is to provide a tire pressure monitoring system and a tire pressure monitoring method that facilitate monitoring of tire pressure regardless of whether a radio frequency band used to transmit tire pressure data detected by a tire pressure sensor provided at each wheel of a vehicle is high.

An example of a tire pressure monitoring system used for a vehicle comprises: a sensor unit that is provided at each wheel of the vehicle, detects tire pressure of the each wheel with a tire pressure sensor and transmits data of the detected tire pressure by radio waves; a receiving device including a receiving antenna that is provided at an outside of the vehicle to receive the data of the tire pressure data transmitted from the sensor unit; and a control device including a data acquisition unit that acquires the data of the tire pressure received by the receiving device.

An example of a tire pressure monitoring method detects, by a tire pressure sensor of a sensor unit provided at each wheel of a vehicle, tire pressure of each wheel, transmits data of the detected tire pressure by radio wave from the sensor unit; and receives, by a receiving device including a receiving antenna provided at an outside of the vehicle, the data of the tire pressure transmitted from the sensor unit; and acquires, by a control device, the data of the tire pressure received by the receiving device.

According to these, the data of tire pressure detected by the tire pressure sensor of the sensor unit provided at each wheel of the vehicle and transmitted from the sensor unit by the radio wave is received by the receiving antenna included in the receiving device and provided at the outside of the vehicle, and therefore, even if the frequency band of the radio waves used is high, an influence of reflection of the radio waves at a vehicle body is suppressed and the receiving at the receiving antenna of the radio waves from the sensor unit provided at each wheel is facilitated. The data of the tire pressure received by the receiving antenna is acquired by the control device. Thus, the acquiring, by the control device, of the data of the tire pressure received by the receiving device from the sensor unit provided at each wheel and the monitoring of the tire pressure of each wheel are facilitated. As a result, it becomes possible to facilitate the monitoring of the tire pressure regardless of whether the radio frequency band used to transmit the tire pressure data detected by the tire pressure sensor provided at each wheel of the vehicle is high.

A plurality of embodiments for the disclosure will be described with reference to the drawings. For convenience of description, the same reference signs are assigned to portions having the same functions as those illustrated in the drawings used in the description so far among the plurality of embodiments, and a description of the same portions may be omitted. The descriptions of other embodiments may be referred to with respect to these portions given the same reference signs.

First Embodiment

<Schematic Configuration of Vehicle System 1>

The present embodiment will now be described with reference to the drawings. As shown in FIG. 1, the vehicle system 1 includes a mobile device 2, sensor units 3, vehicle-side communication devices 4a and 4b, and a control device 5. The vehicle system 1 has a PEPS (Passive Entry Passive Start) function that enables control of the vehicle serving as a target of authentication upon establishment of the authentication at the control device 5, which control device 5 performs the authentication by collation via wireless communication between the mobile device 2 carried by an user and the vehicle-side communication device 4a, 4b provided to the vehicle. In addition, the vehicle system 1 has a Tire Pressure Monitoring (TPM) function that monitors tire pressure such that, via the vehicle-side communication device 4a, 4b, the control device 5 acquires the tire pressure data detected by the sensor unit 3 mounted to each wheel of the vehicle and transmitted by wireless communication. Of the vehicle system 1, a configuration related to the TPM function corresponds to a tire pressure monitoring system and a configuration related to the PEPS function corresponds to an electronic key system.

The mobile device 2 has a function of so-called an electronic key, and may include a switch operated by a user, a wireless communication unit configured to transmit and receive data by means of wireless communication, and a control unit configured to control the wireless communication unit. The mobile device 2 may be so-called a Fob, a multifunctional mobile phone having a function of an electronic key, or the like. The mobile device 2 is capable of executing processing related to the PEPS (Passive Entry Passive Start) function. As a process related to the PEPS function, the mobile device 2 may be configured to transmits a response signal including a code for authentication in wireless communication when a request signal requesting the code for authentication is received in wireless communication, the request signal being sent from the vehicle-side communication devices 4a, 4b.

In this embodiment, description will be given with reference to an example in which the mobile device 2 is a multifunctional mobile phone having a communication function to communicate in accordance with the short-range wireless communication standard of Bluetooth (registered trademark) Low Energy (hereinafter referred to as BLE), and performs the above-mentioned wireless communication in accordance with the short-range wireless communication standard of BLE. The communication in accordance with the BLE short-range wireless communication standard is connection-type communication in which data is transmitted and received through a connection that is a virtual dedicated communication path that is established with the communication partner before starting communication.

As shown in FIG. 1, the sensor unit 3 is provided at each wheel of the vehicle. The sensor unit 3 detects the tire pressure of the wheel at which this unit is provided, and transmits the tire pressure data by wireless communication. The sensor unit 3 also performs the wireless communication in accordance with the BLE short-range communication standard. Although FIG. 1 shows an example when the vehicle is a four-wheeled vehicle, the configuration may apply to a vehicle other than the four-wheeled vehicle. For example, the sensor unit 3 may be configured integrally with a tire valve and attached to a disc wheel of the tire. Details of the configuration of the sensor unit 3 will be described later.

The vehicle-side communication devices 4a, 4b include antennas for transmitting and receiving radio waves in the 2.4 GHz band used in BLE, receive a response signal transmitted from the mobile device 2, and receive the tire pressure data transmitted from the sensor unit 3. A plurality of vehicle-side communication devices 4a, 4b are mounted to the vehicle so as to be optimally arranged for each vehicle type in order to realize the PEPS function. The vehicle-side communication device 4a and the vehicle-side communication device 4b have the same function, but for convenience, the one in which the antenna is provided at an outside of the vehicle is referred to as the vehicle-side communication device 4a, and the other in which the antenna is provided inside the vehicle is referred to as the vehicle-side communication device 4b. In addition, the antenna of the vehicle-side communication device 4a provided at the outside of the vehicle is referred to as an vehicle exterior antenna 41a, and the antenna of the vehicle-side communication device 4b provided inside the vehicle is referred to as an vehicle interior antenna 41b.

As an example, as shown in FIG. 1, the vehicle-side communication devices 4a are provided at the outer door handles for the driver's seat and the front passenger's seat of the vehicle and at the left and right corners and the center of the rear bumper. That is, the vehicle exterior antennas 41a are provided at the outer door handles for the driver's seat and the front passenger's seat of the vehicle and the left and right corners and the center of the rear bumper. As long as the vehicle exterior antenna 41a is provided outside the vehicle interior and at the outside of the vehicle body, the vehicle exterior antenna 41a is not limited to an exposed configuration and may be covered with a member such as resin that hardly shields radio waves. The configuration is not limited to a configuration in which the vehicle-side communication device 4a as a whole is provided at the outside of the vehicle, and the configuration may be such that, of the vehicle-side communication device 4a, at least the vehicle exterior antenna 41a is provided at the outside of the vehicle.

In addition, as shown in FIG. 1, the vehicle-side communication devices 4b are provided at the inner door handles for the driver's seat, the front passenger's seat, and the rear seat, and at the center console, the rear seat, and the left and right corners of a rear portion of the vehicle interior. That is, vehicle interior antennas 41b are provided at the inner door handles for the driver's seat, the front passenger's seat, and the rear seat, and at the center console, the rear seat, and the left and right corners of the rear portion of the vehicle interior. As long as the vehicle interior antenna 41b is provided on the vehicle interior side of the vehicle body, the vehicle interior antenna 41b is not limited to an exposed configuration and may be covered with a member such as resin that hardly shields radio waves. The configuration is not limited to a configuration in which the vehicle-side communication device 4b as a whole is provided inside the vehicle, and the configuration may be such that at least the vehicle interior antenna 41b of the vehicle-side communication device 4b is provided inside the vehicle.

Figure 2:
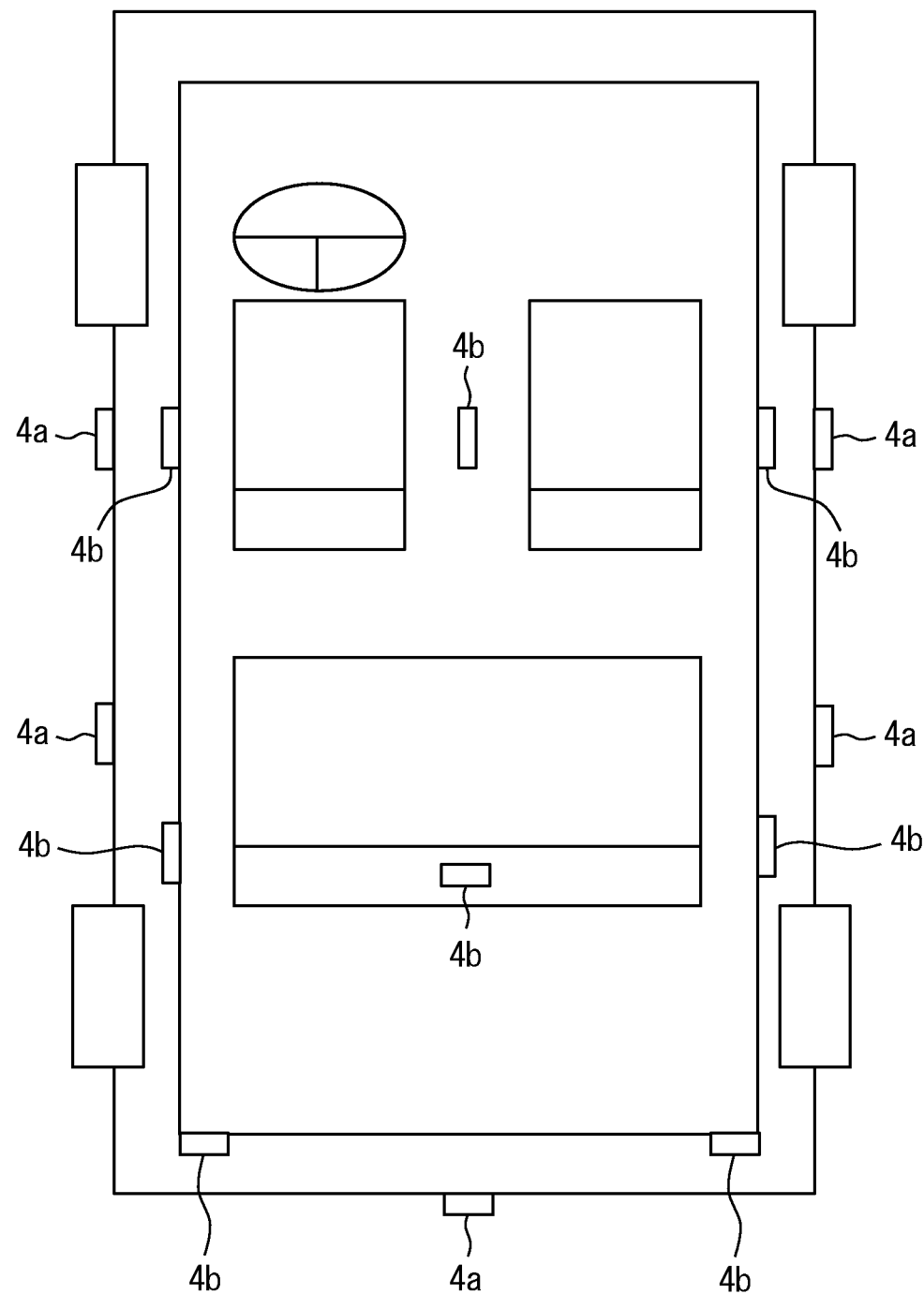
FIG. 2 is a diagram for explaining another example of arrangement of a vehicle-side communication device.

The arrangement example of the vehicle-side communication devices 4a and 4b, the vehicle exterior antenna 41a, and the vehicle interior antenna 41b shown here is merely an example, and other arrangements may be used. For example, as shown in FIG. 2, instead of providing the vehicle-side communication device 4a at the left and right corners of the rear bumper, the vehicle-side communication device 4a may be provided at the outer door handle for the rear seat. That is, instead of providing the vehicle exterior antenna 41a at the left and right corners of the rear bumper, the vehicle exterior antenna 41a may be provided at the outer door handle for the rear seat.

The control device 5 is an electronic control unit comprising, as its main component, a microcomputer including a processor, a memory, and I/O, and a bus connecting these and executes various processes such as processing related to the PEPS function, and processing related to the TPM function by executing control programs stored in the memory. Execution of the control program by the processor corresponds to execution of a method corresponding to the control program. The memory referred to herein is a non-transitory tangible storage medium configured to non-transitorily store a program and data readable by a computer. The non-transitory tangible storage medium is implemented by a semiconductor memory or magnetic disk or the like. The details of the processing by the control device 5 will be described later.

<Schematic Configuration of Sensor Unit 3>

Figure 3:
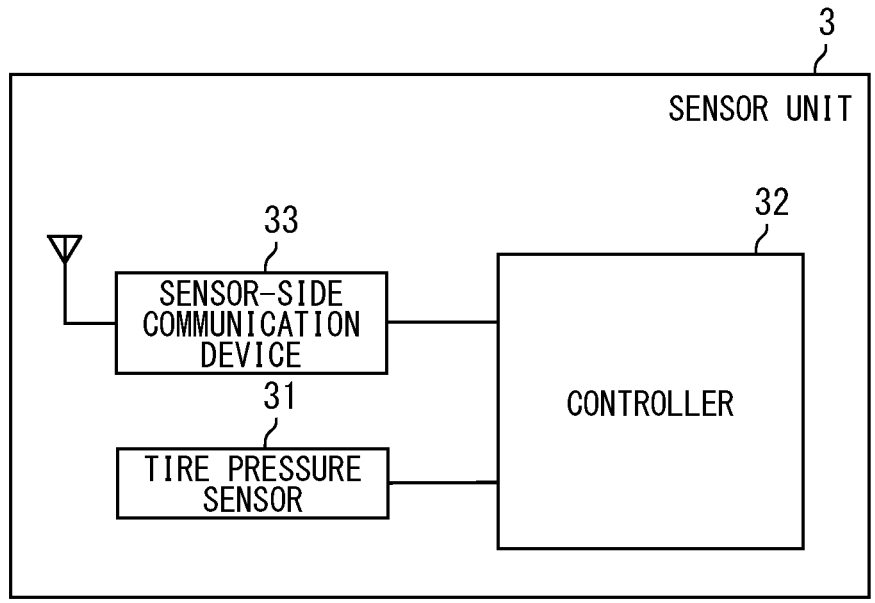
FIG. 3 is a diagram showing an example of a schematic configuration of a sensor unit.

Subsequently, the schematic configuration of the sensor unit 3 will be described with reference to FIG. 3. As shown in FIG.3, the sensor unit 3 includes a tire pressure sensor 31, a controller 32, and a sensor-side communication device 33.

The tire pressure sensor 31 detects the tire pressure of the wheel at which the unit is provided and outputs the tire pressure to the controller 32. The controller 32 is provided by an IC, a microcomputer, or the like having a processor, a memory, and the like. The controller 32 executes various processes by executing a control program stored in the memory. The controller 32 outputs, to the sensor-side communication device 33, the tire pressure data output from the tire pressure sensor 31, and causes the sensor-side communication device 33 to transmit the tire pressure data.

The sensor-side communication device 33 transmits the tire pressure data output from the controller 32 on a radio wave in the 2.4 GHz band in accordance with the BLE short-range communication standard. The sensor-side communication device 33 establishes a one-to-one connection with one of the plurality of vehicle-side communication devices 4a, 4b and transmits the pressure data to the vehicle-side communication device 4a, 4b that has established the connection. The connection between the sensor-side communication device 33 and the vehicle-side communication devices 4a, 4b is not limited to a one-to-one connection, and may be a one-to-many connection, but it is preferable to use a one-to-one connection because it increases the room for connections with other devices.

<Schematic Configuration of Vehicle-Side Communication Devices 4a, 4b>

Figure 4:
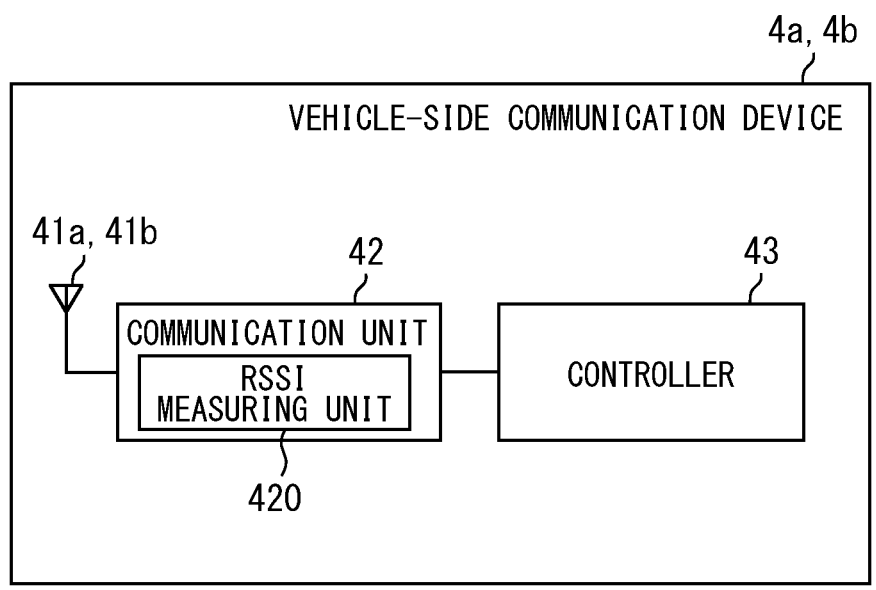
FIG. 4 is a diagram showing an example of a schematic configuration of a vehicle-side communication device.

Subsequently, the schematic configuration of the vehicle-side communication devices 4a, 4b will be described with reference to FIG. 4. As shown in FIG. 4, the vehicle-side communication device 4a includes a vehicle exterior antenna 41a, a communication unit 42, and a controller 43, and the vehicle-side communication device 4b includes a vehicle interior antenna 41b, a communication unit 42, and a controller 43. These vehicle-side communication devices 4a, 4b correspond to receiving devices.

As described above, the vehicle exterior antenna 41a is provided external to the vehicle interior and at the outside of the vehicle body, that is, provided at the outside of the vehicle, and transmits and receives radio waves in the 2.4 GHz band used in BLE. As described above, the vehicle interior antenna 41b is provided on the vehicle interior side of the vehicle body, that is, is provided inside the vehicle, and transmits and receives radio waves in the 2.4 GHz band used in BLE. The vehicle exterior antenna 41a and the vehicle interior antenna 41b correspond to receiving antennas. The vehicle exterior antenna 41a and the vehicle interior antenna 41b may each include a transmitting antenna and a receiving antenna that are integrated or separate.

The communication units 42 includes circuits necessary for performing the communication in accordance with the BLE short-range communication standard, and transmit and receive data via the vehicle exterior antenna 41a and the vehicle interior antenna 41b. The communication unit 42 establishes a one-to-one connection with the communication partner, and transmits and receives data to and from the communication partner with which the connection has been established. When establishing a connection with the mobile device 2, the communication unit 42 transmits the above-mentioned request signal to the mobile device 2 and receives the response signal from the mobile device 2.

On the other hand, when a connection is established with the sensor unit 3, the communication unit 42 receives the tire pressure data from the sensor unit 3. The communication unit 42 outputs the received data to the controller 43. When establishing a connection with the sensor unit 3, the communication unit 42 may, for example, establishes connections with the sensor units 3 of respective wheels in order, and receive the tire pressure data from the sensor units 3 of respective wheels in order.

In addition, the communication units 42 include RSSI measurement units 420 that measure the received strengths (hereinafter, RSSIs) of radio waves received by the vehicle exterior antenna 41a and the vehicle interior antenna 41b, and measures the RSSIs and outputs the RSSIs to the controller 43. The RSSI measurement unit 420 corresponds to a received strength determining unit. When the communication unit 42 is performing communication with the mobile device 2 and/or the sensor unit 3 by establishing the connection, that is, when performing the connection-type communication, the communication unit 42 receives data from the communication partner and determines the RSSI by measuring the RSSI of the radio wave used in the connection-type communication.

On the other hand, when the device including the communication unit 42 is not performing the connection-type communication, the communication unit 42 is preferably able to determine the RSSI by sniffing (that is, interception) the radio wave used in the connection-type communication performed by another vehicle-side communication device 4a, 4b, and receiving the radio wave with the vehicle exterior antenna 41a, the vehicle interior antenna 41b. According to this, the RSSI of the radio wave from the mobile device 2 and the sensor unit 3 can be determined without performing the connection-type communication in the own device. Therefore, while the RSSIs of the radio waves from the mobile device 2 and the sensor unit 3 can be determined by the plurality of vehicle-side communication devices 4a, 4b, it is possible to save time and effort for all of the plurality of vehicle-side communication devices 4a and 4b to sequentially perform the connection-type communication.

The controller 43 sends the data received by the communication unit 42 and the RSSI determined by the RSSI measurement unit 420 of the communication unit 42 to the control device 5. When the communication unit 42 receives the response signal from the mobile device 2, the controller 43 sends the data of the received response signal and the determined RSSI to the control device 5. When the communication unit 42 receives the tire pressure data from the sensor unit 3, the controller 43 sends the received tire pressure data and the determined RSSI to the control device 5. When the communication unit 42 determines the RSSI by sniffing, the controller 43 sends the determined RSSI to the control device 5.

For example, the vehicle-side communication devices 4a and 4b and the control device 5 are connected by wire, and the controller 43 sends the data received by the communication unit 42 and the determined RSSI by the RSSI measurement unit 420 to the control device 5 by wire via the communication I/F. In the present embodiment, the following description will be given by taking as an example the case where the vehicle-side communication devices 4a and 4b and the control device 5 are connected by wire. The configuration is not limited to the configuration in which data and the RSSI are transmitted by wire, and the configuration may be such that the data and the RSSI may be transmitted by wireless communication using radio waves in a low frequency band.

<Schematic Configuration of Control Device 5>

Figure 5:
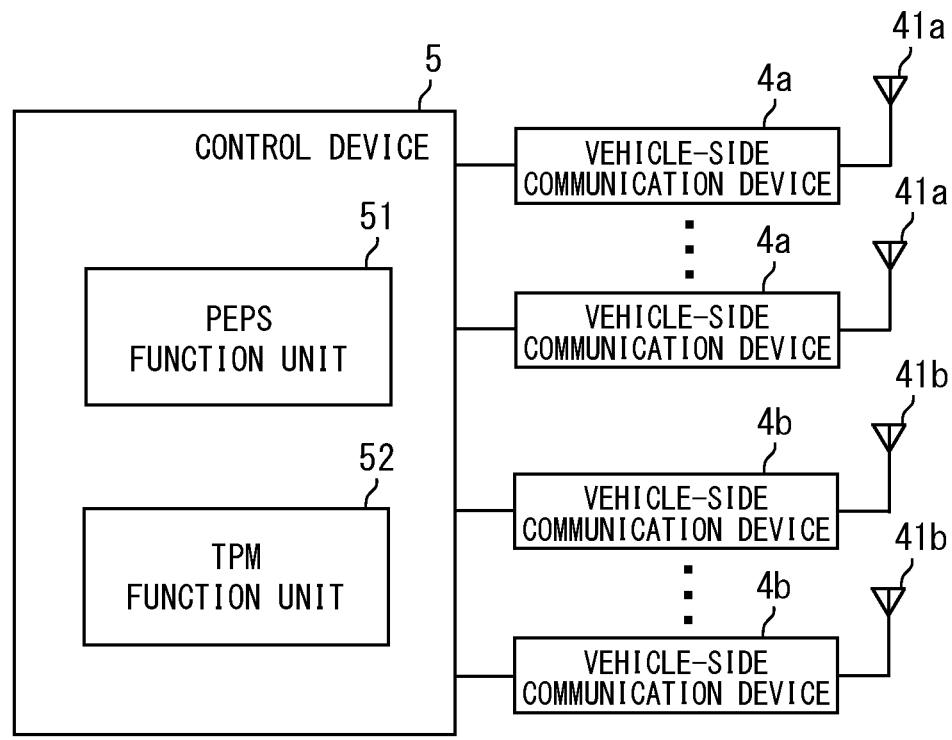
FIG. 5 is a diagram showing an example of a schematic configuration of a control device.

Subsequently, the schematic configuration of the control device 5 will be described with reference to FIG. 5. As shown in FIG. 5, the control device 5 includes a PEPS function unit 51 and a TPM function unit 52 as functional blocks. Some or all of the functions executed by the control device 5 may be configured in hardware by one or more ICs or the like. Alternatively, some or all of the functional blocks included in the control device 5 may be implemented by a combination of software executed by a processor and hardware components.

The PEPS function unit 51 performs processing related to the PEPS function. More specifically, the PEPS function unit 51 requests the vehicle side communication devices 4a, 4b to send the request signal when a predetermined trigger is detected and causes the vehicle side communication devices 4a, 4b to send the request signal. The predetermined triggers include that the vehicle is parked and the door handle SW on the outer door handle is operated, and that the vehicle is parked and the push SW is operated to request the start of the vehicle's driving power source. Subsequently, the PEPS function unit 51 acquires the response signal received from the mobile device 2 by the vehicle-side communication devices 4a and 4b and the RSSI determined by the vehicle-side communication devices 4a and 4b.

The PEPS function unit 51 determines the position of the mobile device 2 inside/outside the vehicle, based on the RSSIs determined by the plurality of vehicle-side communication devices 4a and 4b. More specifically, by using the fact that the pattern of RSSI of the radio waves received from the mobile device 2 by the plurality of vehicle-side communication devices 4a and 4b changes according to the position of the mobile device 2 inside/outside of the vehicle, the PEPS function unit 51 determines the position of the mobile device 2 inside/outside of the vehicle based on the RSSI identified by the plurality of vehicle-side communication devices 4a, 4b.

One example is such that the PEPS function unit 51 may determine the position of the mobile device 2 by the principle of triangulation using the RSSs of at least three of the plurality of vehicle-side communication devices 4a and 4b. Alternatively, for each mode of the user carrying the portable device 2, a map showing the correspondence between the pattern of RSSIs at the plurality of vehicle-side communication devices 4a and 4b and the position of the mobile device 2 may be obtained by simulation, experiment, or the like, stored in the memory of the control device 5 in advance, and the position of the mobile device 2 may be determined by using this correspondence. Examples of the mode of the user carrying the mobile device 2 include carrying it with the hand and carrying it in the back pocket of clothes. By using this correspondence, even if it is difficult to accurately determine the position of the mobile device 2 by the principle of triangulation due to the influence of absorption of 2.4 GHz band radio waves by the human body, it becomes possible to accurately determine the position of the mobile device 2.

Furthermore, the PEPS function unit 51 performs authentication using the code for authentication included in the response signal, and locks or unlocks the doors of the vehicle, permits the vehicle's driving source to be started, etc., depending on the location of the mobile device 2 determined based on the RSSI and whether or not the authentication is established.

The PEPS function unit 52 performs processing related to the PEPS function. Details of the processing by the TPM function unit 52 will be described below.

<Schematic Configuration of TPM Function Unit 52>

Figure 6:
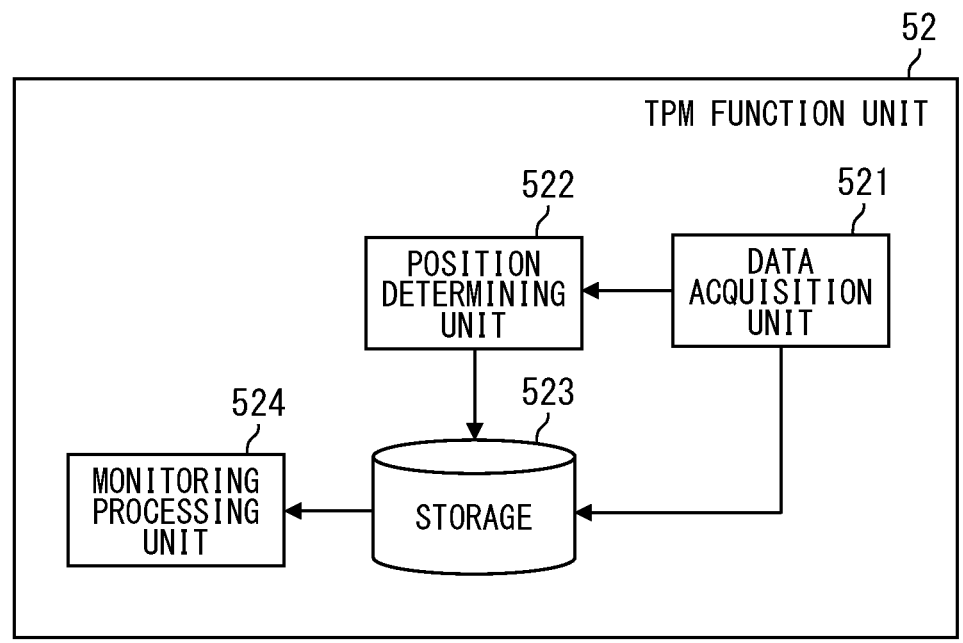
FIG. 6 is a diagram showing an example of a schematic configuration of a TPM functional unit.

Here, the schematic configuration of the TPM functional unit 52 will be described with reference to FIG. 6. As shown in FIG. 6, the TPM function unit 52 includes a data acquisition unit 521, a position determining unit 522, a storage unit 523, and a monitoring processing unit 524 as sub-function blocks.

The data acquisition unit 521 acquires the tire pressure data received by the vehicle-side communication devices 4a and 4b from the sensor unit 3 and the RSSIs of the radio waves received from this sensor unit 3, the RSSIs being determined by the plurality of vehicle-side communication devices 4a and 4b. Each time the vehicle-side communication devices 4a, 4b receive tire pressure data from the sensor units 3 of respective wheels in turn, the data acquisition unit 521 may acquire the tire pressure data and the RSSIs of the radio waves received from the sensor unit 3, the RSSIs being determined by the plurality of vehicle-side communication devices 4a, 4b.

Based on the RSSIs of the radio waves received from the same sensor unit 3 which RSSIs, respectively, are determined by the plurality of vehicle-side communication devices 4a, 4b and which RSSIs are acquired by the data acquisition unit 521, the position determining unit 522 determines the position of that sensor unit 3, i.e., the tire position where the sensor unit 3 is provided. The tire position may be determined by the position determining unit 522 based on the RSSI in the same way as the position of the mobile device 2 is determined by the PEPS function unit 51.

The position determining unit 522 is preferable to determine the tire position using a map or the like that shows, for each position of the user, the correspondence between the pattern of RSSI at the plurality of vehicle-side communication devices 4a, 4b and the position of the sensor unit 3. By using this correspondence, even if it is difficult to accurately determine the position of the tire position by the principle of triangulation due to the influence of absorption of 2.4 GHz band radio waves by the human body, it becomes possible to accurately determine the tire position.

The data acquisition unit 521 stores the acquired tire pressure data in the storage unit 523 as the tire pressure data of the tire position determined by the position determining unit 522. The data acquisition unit 521 may be configured to sequentially update the tire pressure data by overwriting the latest data for each tire position. In addition, the time series data for a plurality of times including the latest data may be stored in the storage unit 523 for each tire location.

The monitoring processing unit 524 monitors the data of tire pressure for each tire position stored in the storage unit 523, and when there is an abnormality, the monitoring processing unit 524 outputs a signal indicating the abnormality of the tire pressure to an electronic control unit that notifies about the tire pressure and causes the electronic control unit to give an alarm indicating the abnormality of the tire pressure. With regard to the presence and absence of the abnormality of the tire air pressure, the monitoring processing unit 524 may make a comparison with a threshold for abnormality presence/absence determination, thereby determining whether the abnormality of the tire pressure is present or absent. Further, the monitoring processing unit 524 may be configured to output the latest tire pressure data to an electronic control unit such as the meter ECU and cause the ECU to display the tire pressure at each tire location.

<TPM-Related Processing in Vehicle System 1>

The sequence diagram of FIG. 7 is a sequence diagram showing an example of a flow of processing related to the TPM function (hereinafter referred to as TPM-related processing) in the vehicle system 1. The sequence diagram of FIG. 7 shows an example of the flow of TPM-related processing from the start of detection of the tire pressure by the sensor unit 3 provided at each wheel to the monitoring of the tire pressure by the control device 5. In the sequence diagram of FIG. 7, for convenience, the sensor units 3 provided at respective wheels are shown collectively, and the plurality of vehicle-side communication devices 4a and 4b are shown collectively as one(s) having established the connection and one(s) having not established the connection. It may be configured such that the detection by the tire pressure at the sensor unit 3 may be started periodically or may be started upon detection of a predetermined trigger. Executing this TPM-related process corresponds to executing a tire pressure monitoring method.

First, the tire pressure sensor 31 of the sensor unit 3 detects the tire pressure (t1). Then, the sensor-side communication device 33 transmits the detected tire pressure data on the radio waves to the vehicle-side communication devices 4a and 4b with which the connection has been established (t2). The communication unit 42 of the vehicle-side communication device 4a and 4b having established the connection with the sensor unit 3 (i.e., the connection) receives the tire pressure data transmitted from this sensor unit 3 (t3). This communication unit 42 determines the RSSI of the radio waves used to transmit this tire pressure data, by the RSSI measurement unit 420 measuring the RSSI (t4). Then, the controller 43 outputs, to the control device 5, the tire pressure data received by the communication unit 42 and the RSSI determined by the RSSI measurement unit 420 (t5).

Along with this, the communication unit 42 of the vehicle-side communication devices 4a and 4b having not established the connection with the sensor unit 3 (that is, non-connection) sniffs the radio waves used in the connection-type communication performed by the vehicle-side communication device 4a, 4b that has established the connection (t6). This communication unit 42 determines the RSSI of the radio wave received from the sensor unit 3 by sniffing, by the RSSI measurement unit 420 measuring the RSSI (t7). Then, the controller 43 outputs this RSSI determined by the RSSI measurement unit 420 to the control device 5 (t8). The processing of t6 to t8 is performed by each of a plurality of vehicle-side communication devices 4a and 4b that have not established the connection with the sensor unit 3.

Subsequently, the data acquisition unit 521 of the control device 5 acquires the tire pressure data and RSSIs output from the vehicle-side communication devices 4a and 4b having established the connection, and acquires the RSSIs output from a plurality of vehicle-side communication devices 4a and 4b having not established the connection (t9). Based on the RSSIs of the radio wave received from the same sensor unit 3 which RSSIs are determined by the plurality of vehicle-side communication devices 4a and 4b and which RSSIs are acquired by the data acquisition unit 521, the position determining unit 522 determines the tire location in which this sensor unit 3 is mounted (t10). Then, the data acquisition unit 521 stores the acquired tire pressure data in the storage unit 523 as the tire pressure data of the tire position identified by the position determining unit 522 (t11). The processing of t1 to t11 may be sequentially performed for each sensor unit 3 of each wheel.

Subsequently, the monitoring processing unit 524 monitors the tire pressure data for each tire position stored in the storage unit 523 and determines whether there is an abnormality in the tire pressure (t12). Then, when it is determined that there is the abnormality (YES at t12), a signal indicating the abnormality in the tire pressure is output to an electronic control unit such as the meter ECU, and causes the electronic control unit to alert indicating the abnormality in the tire pressure (t13). On the other hand, when it is determined that there is no abnormality (NO at t12), this alarm is not issued.

<Summary of First Embodiment>

According to the configuration of the first embodiment, the tire pressure data transmitted by radio waves from the sensor unit 3 provided at each wheel of the vehicle is received by the vehicle exterior antenna 41a provided at the outside of the vehicle, and therefore, even if the frequency band of the radio wave to be used is higher, the influence of reflection of the radio wave by the vehicle body is suppressed and the radio wave from the sensor unit 3 provided at each wheel is easily received. Then, since the control device 5 acquires the tire pressure data received by the vehicle exterior antenna 41a, it becomes easy for the control device 5 to monitor the tire pressure of each wheel based on the tire pressure data. As a result, regardless of the frequency band of the radio waves used to transmit the tire pressure data detected by the tire air pressure sensor provided at each wheel of the vehicle, it becomes possible to facilitate the monitoring of the tire air pressure.

The wheels may be mounted at positions different from the previous positions due to vehicle repair, rotation of the wheel mounting positions, or the like. Therefore, the positions of the sensor units 3 on respective wheels may be interchanged. Therefore, when there is such a replacement, it is necessary to identify which sensor unit 3 is in which position. For addressing this, according to the configuration of the first embodiment, the tire location where the sensor unit 3 is provided is determined based on the RSSIs of the radio waves received from the same sensor unit 3, the RSSIs being determined by the plurality of vehicle-side communication devices 4a and 4b, respectively. Therefore, even if the wheel is mounted at a position different from the previous position, each time this is done, it is possible to re-determine the tire position where the sensor unit 3 is provided, and it is possible to store the tire pressure data for each correct tire position. Further, since the RSSIs of the radio wave received from the same sensor unit 3 determined by the plurality of vehicle-side communication devices 4a and 4b are used to determine the tire position, it is possible to save efforts to cause the sensor unit 3 to transmit an identifier for individually identifying each wheel and/or to associate it with gear information of ABS.

Further, according to the configuration of the first embodiment, since a plurality of vehicle exterior antennas 41a are provided, it becomes easier to receive radio waves from the sensor units 3 provided at respective wheels. Further, according to the configuration of the first embodiment, since a plurality of vehicle interior antennas 41b are also provided in the vehicle, it becomes easier to receive radio waves from the sensor units 3 provided at respective wheels.

In addition, according to the configuration of the first embodiment, the vehicle exterior antennas 41a and the vehicle interior antenna 41b used in the electronic key system which is capable of determining the location of the mobile device 2 based on the RSSIs of the radio waves received from the mobile device 2 by the plurality of vehicle exterior antennas 41a and the vehicle interior antennas 41b are also used for the processing related to the TPM function, and therefore, it is possible to save works to provide the vehicle with other antenna for the processing related to the TPM function than the antenna that is used for the electronic key system.

Second Embodiment

The configuration shown in the first embodiment is such that the communication unit 42 of the vehicle-side communication device 4a, 4b having not established the connection with the sensor unit 3 performs sniffing of radio waves that the vehicle-side communication device 4a, 4b having established the connection is using in the connection-type communication, and that the RSSI of the radio wave received, by the sniffing, from the sensor unit 3 is determined; however, this is not limiting. For example, a configuration may be such that the communication unit 42 of the vehicle-side communication device 4a, 4b having not established the connection with the sensor unit 3 may not perform the sniffing. In this case, a plurality of vehicle-side communication devices 4a, 4b may each establish the connection with the sensor unit 3 and may determine the RSSI of the radio wave received from the sensor unit 3 while performing the connection-type communication.

Third Embodiment

The configuration shown in the first embodiment is such that the antennas for receiving the radio wave transmitted from the sensor units 3 include a plurality of vehicle interior antennas 41b, but this is not necessarily limiting. For example, the antennas for receiving the radio waves transmitted from the sensor units 3 may include no vehicle interior antenna 41b. Even in this case, the radio waves transmitted from the sensor units 3 provided at respective wheels are receivable by the plurality of vehicle exterior antennas 41a. This makes it possible to more easily monitor tire pressure regardless of whether the frequency band of the radio waves used to transmit the data on tire pressure detected by the tire pressure sensors provided at each wheel of the vehicle is high.

Fourth Embodiment

In the first embodiment, the antennas for receiving the radio waves transmitted from the sensor units 3 include a plurality of vehicle exterior antennas 41a, but this is not limiting. For example, the number of vehicle exterior antennas 41a included in the antennas for receiving the radio waves transmitted from the sensor units 3 may be one. Even in this case, the radio waves transmitted from the sensor units 3 provided at respective wheels are receivable by this vehicle exterior antenna 41a. This makes it possible to more easily monitor tire pressure regardless of whether the frequency band of the radio waves used to transmit the data on tire pressure detected by the tire pressure sensors provided at respective wheels of the vehicle is high.

Fifth Embodiment

In the first embodiment, the position determining unit 522 determines the tire position where the sensor unit 3 is provided, but this is not necessarily limiting. For example, the TPM function unit 52 may not be provided with the position determining unit 522, and may be configured not to determine the tire position where the sensor unit 3 is provided.

Sixth Embodiment

In the first embodiment, the antennas used in the electronic key system capable of determining the location of the mobile device 2 based on the RSSIs of radio waves received by multiple antennas from the mobile device 2 are also used for the processing related to the TPM function, but this is not necessarily limiting. For example, the antennas used in the electronic key system capable of determining the location of the mobile device 2 based on the RSSIs of radio waves received by multiple antennas from the mobile device 2 may not be used for the processing related to the TPM function.

Seventh Embodiment

The first embodiment shows the configuration in which the wireless communication in accordance with the BLE short-range wireless communication standard is performed between the sensor unit 3 and the vehicle-side communication devices 4a and 4b, but this is not necessarily limiting. For example, in the case of wireless communication using a high frequency band such as the GHz band, wireless communications other than the wireless communication in accordance with the BLE short-range wireless communication standard may be used.

Although a plurality of embodiments have been illustrated above, the embodiments are not limited to the above-described embodiments, and various modifications and extensions are possible. For example, embodiments obtained by appropriately combining the technical elements disclosed in different embodiments are also included in the present disclosure.

What is claimed is:

1. A tire pressure monitoring system used for a vehicle, comprising:

a sensor unit that is provided at each wheel of the vehicle, detects tire pressure of the each wheel with a tire pressure sensor and transmits data of the detected tire pressure by radio waves;

a plurality of receiving devices including a plurality of receiving antennas that are provided at different positions of an outside of the vehicle to receive the data of the tire pressure transmitted from the sensor unit; and a control device including a data acquisition unit that acquires the data of the tire pressure received by the receiving device.

2. The tire pressure monitoring system according to claim 1, further comprising:

the plurality of receiving devices including a plurality of receiving antennas that are provided inside the vehicle and are at different positions.

3. The tire pressure monitoring system according to claim 1, wherein:

the plurality of receiving devices include a plurality of received strength determining units and the received strength determining units included in the receiving devices determine a received strength of the radio waves received by the receiving antennas included in the receiving devices; and the control device includes a position determining unit that determines, based on the received strengths determined by the plurality of the received strength determining units of the plurality of the receiving devices, a position in the vehicle of the sensor unit that is a source of the radio waves.

4. The tire pressure monitoring system according to claim 3, wherein:

the data of the tire pressure is transmitted and received by means of connection-type communication between the sensor unit and the receiving device; and of the plurality of receiving devices, the receiving device being not performing the connection-type communication with the sensor unit receives, at the receiving antenna, by means of sniffing, the radio waves that are used in transmitting the data of the tire pressure from the sensor unit by means of the connection-type communication, and determines the received strength of this radio waves by the received strength determining unit.

5. The tire pressure monitoring system according to claim 4, wherein the connection-type communication performed by the sensor unit and the receiving device is one-to-one communication.

6. The tire pressure monitoring system according to claim 1, wherein the receiving antennas further act as a receiving antenna used in an electronic key system that is capable of locating a mobile device functioning as an electronic key based on received strengths of radio waves received by the plurality of receiving antennas from the mobile device.

7. A tire pressure monitoring method comprising:

by a tire pressure sensor of a sensor unit provided at each wheel of a vehicle, detecting tire pressure of the each wheel;

transmitting the detected tire pressure by radio wave from the sensor unit;

by a plurality of receiving devices including a plurality of receiving antennas provided at different positions of an outside of the vehicle, receiving the data of the tire pressure transmitted from the sensor unit; and by a control device, acquiring the data of the tire pressure received by the receiving device.

8. A tire pressure monitoring system for a vehicle, comprising:

a sensor unit mounted to each wheel of the vehicle and configured to detect, by a tire pressure sensor, tire pressure of the each wheel and transmits data of the detected tire pressure by radio waves;

one or more first antennas provided at an outside of the vehicle to receive the data of the tire pressure transmitted from the sensor unit; and a processor configured to acquire the data of the tire pressure received via the one or more first antennas, wherein the one or more first antennas is a plurality of first antennas, and the plurality of first antennas are provided at different positions at the outside of the vehicle.

9. The tire pressure monitoring system according to claim 8, further comprising:

a plurality of second antennas provided inside the vehicle to receive the data of the tire pressure transmitted from the sensor unit, wherein the plurality of second antennas are provided at different positions.

10. The tire pressure monitoring system according to claim 8, wherein one or more of the first antennas further acts as a receiving antenna used in an electronic key system of the vehicle, the electronic key system being configured to locate a mobile device functioning as an electronic key based on received strengths of radio waves received by a plurality of the receiving antennas from the mobile device.

11. A tire pressure monitoring system used for a vehicle, comprising:

a sensor unit that is provided at each wheel of the vehicle, detects tire pressure of the each wheel with a tire pressure sensor and transmits data of the detected tire pressure by radio waves;

a plurality of receiving devices including a plurality of receiving antennas that are provided at different positions of an inside of the vehicle to receive the data of the tire pressure transmitted from the sensor unit; and a control device including a data acquisition unit that acquires the data of the tire pressure received by the receiving device.

12. A tire pressure monitoring method comprising:

by a tire pressure sensor of a sensor unit provided at each wheel of a vehicle, detecting tire pressure of the each wheel;

transmitting the detected tire pressure by radio wave from the sensor unit;

by a plurality of receiving devices including a plurality of receiving antennas provided at different positions of an inside of the vehicle, receiving the data of the tire pressure transmitted from the sensor unit; and by a control device, acquiring the data of the tire pressure received by the receiving device.

13. A tire pressure monitoring system for a vehicle, comprising:

a sensor unit mounted to each wheel of the vehicle and configured to detect, by a tire pressure sensor, tire pressure of the each wheel and transmits data of the detected tire pressure by radio waves;

one or more first antennas provided at an outside of the vehicle to receive the data of the tire pressure transmitted from the sensor unit;

a processor configured to acquire the data of the tire pressure received via the one or more first antennas; and
a plurality of second antennas provided inside the vehicle to receive the data of the tire pressure transmitted from the sensor unit, wherein the plurality of second antennas are provided at different positions.

* * * * *